United States Patent [19]
McGarry et al.

[11] Patent Number: 4,943,544
[45] Date of Patent: Jul. 24, 1990

[54] HIGH STRENGTH, ABRASION RESISTANT REFRACTORY CASTABLE

[75] Inventors: Charles N. McGarry, Clarksville, Ind.; Clarence W. J. Miller, Louisville, Ky.; Thomas M. Wehrenberg, Jeffersonville, Ind.

[73] Assignee: Corhart Refractories Corporation, Louisville, Ky.

[21] Appl. No.: 420,672

[22] Filed: Oct. 10, 1989

[51] Int. Cl.$^5$ .................. C04B 35/10; C04B 14/04; C04B 14/30
[52] U.S. Cl. ........................... 501/124; 501/88; 501/89; 501/105; 501/107; 501/125; 106/692; 106/694; 106/638; 106/733; 106/718; 106/811; 106/814
[58] Field of Search ............ 501/88, 89, 125, 105, 501/107, 124, 94; 106/97, 98, 104, 85

[56] References Cited
U.S. PATENT DOCUMENTS 3,060,043 10/1962 Renkey ......................... 106/64
4,711,298 12/1987 Rogier et al. ................. 165/165

FOREIGN PATENT DOCUMENTS 76-22650 2/1977 France .

Primary Examiner—Mark L. Bell
Assistant Examiner—David M. Brunsman
Attorney, Agent, or Firm—Panitch Schwarze Jacobs & Nadel

[57] ABSTRACT

A refractory composition is disclosed which possesses low porosity, high density, exceptional strength and high abrasion resistance and is useful for lining fluid catalytic converter units, e.g., catalyst transfer lines, riser lines, J-bends, cyclones and all other areas where hot abrasion resistance and low thermal conductivity are desired. The composition consists essentially of by weight: (a) 44 to 89% of an abrasion-resistant refractory grain; (b) 10 to 50% of a hydraulically setting cement; (c) 1 to 6% of a filler consisting of very fine, substantially spherical particles of a metal oxide selected from the group consisting of $Al_2O_3$, $Cr_2O_3$, $ZrO_2$, $TiO_2$, clay minerals, carbon and fume $SiO_2$; and (d) 0.01 to 1%, based on the total weight of the constituents (a), (b) and (c), of additives selected from deflocculants and wetting agents.

30 Claims, No Drawings

HIGH STRENGTH, ABRASION RESISTANT REFRACTORY CASTABLE

BACKGROUND OF THE INVENTION

This invention relates to refractory castable compositions based on fused oxides including a vitreous phase. These compositions have low porosity, high strength and high hot abrasion resistance.

Refractory materials are used in virtually all petroleum refining and process industry units that operate at elevated temperatures. The temperatures inside fluid catalytic cracking units, for example, can reach as high as 800° C. Thus, these and other units must be lined with a material that can provide high resistance to such elevated high temperatures and which is inert to the chemicals and atmospheres encountered during processing.

For some time, units were lined with fire brick, but it was found that such linings possessed poor abrasion resistance. It is now standard in the industry to line such units with a refractory castable composition with good insulation value and abrasion resistance. The units are lined by building metal forms on the inside of the unit, directing the refractory castable composition into the forms while vibrating at high intensity, allowing the composition to set and then removing the metal forms.

Although refractory castable compositions useful for lining units as described above are currently available on the market, there is a need for higher performance, longer lasting refractories. The refractory linings in catalytic cracking units are generally two to four inches thick, and up to 400 tons of refractory castable composition can be required to line a single unit. Needless to say, the cost of repairing or replacing such a refractory lining can be quite high. Even more important than the replacement cost of the lining is the cost of the downtime of the unit during the repair which can take several weeks.

SUMMARY OF THE INVENTION

A new refractory composition has now been found which possesses low porosity, high density, exceptional strength and high abrasion resistance and which will extend the service life of the high wear areas of catalytic converting units within the crude oil refining process. This new composition consists essentially of by weight:

(a) 44 to 89 % of an abrasion-resistant refractory grain;
(b) 10 to 50 % of a hydraulically setting cement;
(c) 1 to 6 % of a filler consisting of very fine, substantially spherical particles of a metal oxide selected from the group consisting of $Al_2O_3$, $Cr_2O_3$, $ZrO_2$, $TiO_2$ clay minerals, carbon and fume $SiO_2$;
(d) 0.01 to 1%, based on the total weight of the constituents (a), (b) and (c), of additives selected from deflocculants and wetting agents.

DETAILED DESCRIPTION OF THE INVENTION

An abrasion-resistant refractory grain comprises 44 to 89 % by weight of the refractory castable composition of this invention. Preferably, the refractory grain comprises 54 to 79 % by weight of the composition. One skilled in the art will be capable of selecting an abrasion-resistant refractory grain suitable for use in preparing the refractory compositions of this invention. The preferred refractory material for compositions for use in applications where low thermal conductivity is desired (e.g., the fluid catalytic cracking units described above) are particles of a fused AZS (alumina-zirconia-silica). The fused AZS refractory material has, as its main constituents, $Al_2O_3$, $ZrO_2$ and $SiO_2$, or $Al_2O_3$, $ZrO_2$, $SiO_2$, and $Cr_2O_3$, and will typically comprise about 32.5-54 % by weight $ZrO_2$, about 36-51 % by weight $Al_2O_3$, about 2-16 % by weight $SiO_2$, about 0.28-1.5 % by weight $Na_2O$ and less than about 1.5 % by weight of other oxides. Suitable such materials are disclosed in French Pat. No. 1,208,577 and its Addition No. 75,893. The chemical composition of the AZS has not been found to be critical; however, a preferred AZS grain has the following chemical composition:

| | |
|---|---|
| 49.0% | $Al_2O_3$ |
| 34.0% | $ZrO_2$ |
| 15.0% | $SiO_2$ |
| 0.1% | $Fe_2O_3$ |
| 0.2% | $TiO_2$ |
| 1.5% | $Na_2O$ |
| 0.2% | Other |

The mineralogical composition of this preferred AZS is 48% corundum, 32% zirconia and 20% vitreous phase.

For use in applications where low thermal conductivity is not a necessity, other abrasion-resistant refractory grains may be used. Examples of such suitable materials which can be used alone or in combination to prepare cast pieces with unique abrasion resistance, strength and cold crushing properties include but are not limited to fused alumina, silicon carbide, fused mullite, fused zirconia, and fused alumina-zirconia. These materials can be used themselves as the refractory grains or may be combined with fused AZS for use in preparing the refractory compositions of this invention.

The refractory grain used in this invention preferably has specific particle size fractions. The particle size distribution is carefully graded so that successively finer pores are filled with increasingly finer particles down to the sub-micron range. This leads to a composition with maximum packing density and thus to a resultant cast body having low firing shrinkage, low porosity, high density, exceptional strength and low erosion loss.

Generally speaking, the particle size distribution of the refractory grain is such that particles range in size from about +325 mesh to about −4 mesh, the distribution of particle sizes within that range preferably being substantially even. As an example, the preferred and more preferred refractory grains will have particle size distributions falling within the following ranges set forth in Table 1.

TABLE 1

| Tyler Mesh | Microns | % on Screen Preferred | % on Screen More Preferred |
|---|---|---|---|
| +4 | 4760 | 0-5 | 0-1.5 |
| +8 | 2380 | 22-45 | 32-35 |
| +14 | 1190 | 49-76 | 59-66 |
| +35 | 420 | 68-90 | 78-84 |
| +325 | 44 | 85-100 | 93-96 |
| −325 | 44 | 0-15 | 4-7 |

The second component of the refractory composition of this invention is a hydraulically setting cement which forms from 10 to 50 %, preferably about 20 to 40 %, by weight of the overall composition. Such cements are known in the art. The preferred cement is a high purity calcium aluminate cement, formed by reacting high purity lime with calcined or hydrated alumina. High purity calcium aluminate cements currently available contain approximately 80% by weight $Al_2O_3$ and 17.0% by weight CaO and have a particle size of approximately 95-97% −325 mesh (44 microns). Lower purity calcium aluminate cements, e.g., those containing approximately 70% $Al_2O_3$, may also be used. When the refractory castable composition is to be used in a reducing atmosphere, it is important that the calcium aluminate cement have low silica (about 0 0.1%) and $Fe_2O_3$ (about 0.1%).

The filler which comprises component (c) of the composition of this invention is formed of very fine, substantially spherical particles of materials selected from the group consisting of $Al_2O_3$, $Cr_2Ohd 3$, $ZrO_2$, $TiO_2$, clay minerals, carbon and fume $SiO_2$. The surface area of the materials should generally be higher than 5 m2/g. It is preferred to use particles of fume silica, vitreous silica in particles having a mean diameter of .15 microns and a surface area of 18-28 $m^2$/g. This vitreous silica appears in microspheres, has a content of $SiO_2$ of at least 96.5%, and the balance may be formed of $Na_2O$, $Al_2O_3$, $ZrO_2$ and/or carbon. Particles of silica of this type are well known and available in the trade. Component (c) comprises 1-6 wt. % of the overall composition, preferably about 1-3 wt. %.

Additives such as deflocculants and wetting agents can comprise 0.01 to 1 % by weight, based on the total weight of the constituents (a), (b) and (c), of the refractory castable composition. Suitable additives are known in the art and include calgon, polyphosphates, citric acid and sodium citrate. The preferred defloculant/wetting agent is a sodium salt of polymerized substituted benzoid alkyl sulfonic acids such as that sold under the tradename Darvan(R) by R. T. Vanderbilt Company, Inc., Norwalk, Conn.

The refractory compositions of this invention are especially useful for lining fluid catalytic converter units, e.g., catalyst transfer lines, riser lines, J-bends, cyclones and all other areas where hot abrasion resistance and low thermal conductivity are desired. When it is desired to work up the compositions of this invention, they are mixed intimately with an amount of water of between about 5.5 and 8 %, preferably about 6.25 and 6.75%, by weight with respect to the total weight of the composition. Best results have been obtained with a mixing time of about five minutes. The composition should be cast immediately after mixing, with forms being heavily vibrated to remove entrapped air and enhance flow. The ideal casting temperature is 72° F. After initial hard set, the refractory should be kept damp to prevent evaporation of the water before complete reaction is accomplished. The cast surface may be moistened with a fine water spray or covered with wet burlap bags or plastic film for twelve to twenty-four hours depending on thickness. The ideal curing temperature range is 70-85° F.

Typical physical properties of samples of the refractory compositions of this invention are presented in Table 2.

TABLE 2

| Typical Physical Properties of Compositions of Invention (Samples fired to 816° C.) | |
|---|---|
| Modulus of Rupture | 2500 PSI |
| Cold Crushing | 12000 PSI |
| Bulk Density | 173 lbs/ft$^3$ |
| Erosion Loss | 4.5 cm$^3$ |
| Linear Change | −0.2% |

TABLE 2-continued

| Typical Physical Properties of Compositions of Invention (Samples fired to 816° C.) | |
|---|---|
| Apparent (Open) Porosity | 21% |
| Thermal Conductivity | 9.5 BTU/in/hr/ft$^2$/°F. |

The data presented in Table 2 and the data presented in the following examples were obtained using the following test procedures:
Modulus of Rupture-ASTM C-133
Cold Crushing-ASTM C-133
Bulk Density-ASTM C-20-74
Erosion Loss-ASTM C-704
Linear Change-Measure block after air drying 24 hours with dial calipers. Measure after firing to 816° C. Linear change =(Air dried width-Fired width)/Air dried width.
Apparent (Open) Porosity-ASTM C-20-74 Modified; $H_2O$ absorbed by vacuum impregnation for 30 minutes instead of boiling for 2 hours; sample size =1" cubes.
Thermal Conductivity-Nine dried pieces of 4½" long ×4½" wide ×3" thick blocks separated by 1" thick thermal insulation board are placed in a laboratory sized gas fired kiln. The kiln is heated to 1500° F. and held for 12 hours. Cold face temperatures are then measured with an optical pyrometer (infrared) and used to calculate thermal conductivity. The hot wire method may alternatively be used.

The following examples are presented to further illustrate this invention. These examples are illustrative only and are not intended to limit in any way the scope of this invention.

EXAMPLES 1-9

Several refractory compositions according to this invention were mixed and cast to demonstrate the effect of various constituents upon the pot life, use characteristics and physical properties of the resultant cast bodies. The AZS used in preparing these compositions had the following chemical composition:

| 49.0% | $Al_2O_3$ |
|---|---|
| 34.0% | $ZrO_2$ |
| 15.0% | $SiO_2$ |
| 0.1% | $Fe_2O_3$ |
| 0.2% | $TiO_2$ |
| 1.5% | $Na_2O$ |
| 0.2% | Other |

The particle size distribution of the AZS was that specified in Table 1 as "more preferred".

The refractory compositions were mixed in a Hobart 20 quart mixer adding all dry ingredients first and mixing for two minutes before adding water. After mixing with water for five minutes, the batch was cast in "shoe box" lucite molds measuring 4.5"×4.5"×9" while placed on a vibrating table operating at a frequency of 3600 vpm at a low amplitude for two to three minutes to remove entrapped air. The cast samples were then permitted to remain in the molds for twenty-four hours, after which the molds were stripped. The exposed samples were then air dried an additional twenty-four hours before placing in an oven at 110° C. for twenty-four hours.

After drying, test specimens were cut from the shoe box sample for abrasion, cold crushing, density, porosity, and thermal conductivity measurements. The cut samples were then held at 816° C. (1500° F.) for five hours heating to this temperature at a rate requiring approximately sixteen hours. The samples were then cooled at kiln rate (approximately twenty-four hours).

These compositions and their physical characteristics are presented in Table 3.

TABLE 3

| | EX. 1 | EX. 2 | EX. 3 | EX. 4 | EX. 5 | EX. 6 | EX. 7 |
|---|---|---|---|---|---|---|---|
| AZS (Wt. %) | 68 | 68 | 68 | 48 | 88 | 64 | 70 |
| C.A.C. (Wt. %) | 30 | 30 | 30 | 50 | 10 | 30 | 30 |
| F. $SiO_2$ (Wt. %) | 2 | 2 | 2 | 2 | 2 | 6 | — |
| Deflocc. (Wt. %) | .5 | .5 | .5 | .5 | .5 | .5 | .5 |
| $H_2O$ (Wt. %) | 7.75 | 5.75 | 6.5 | 9.5 | 3.5 | 6.5 | 6.75 |
| App.Por. % | 22.6 | 20.2 | 21.6 | 27.1 | 22.5 | 20.9 | 22.0 |
| Bulk Den. #/$Ft^3$ | 173 | 177 | 172 | 155 | 167 | 170 | 175 |
| Cold Crushing, PSI | 9170 | 13590 | 12050 | 11910 | 4840 | 12520 | 15160 |
| Firing Shrinkage, % | .21 | .18 | .22 | .26 | .02 | .42 | .12 |
| Erosion Loss, $cm^3$ | 5.4 | 3.6 | 4.4 | 4.8 | 5.2 | 4.2 | 5.2 |
| Thermal Cond. BTU/in/hr/$Ft^2$/°F. | 9.2 | 10.1 | 10.0 | 8.5 | 9.4 | 9.0 | 10.6 |
| Mix Characteristics | Too Fluid | Fair/ Poor | Excel. | Excel. | Poor | Poor | Excel. |
| Remarks | *1 | *2 | *3 | *4 | *5 | *6 | *3 |

| | EX. 8 | EX. 9 |
|---|---|---|
| Fused Alumina Grain | 68 | — |
| AZS (Wt. %) | — | 69 |
| C.A.C. (Wt. %) | 30 | 30 |
| F. $SiO_2$ (Wt. %) | 2 | 1 |
| Deflocc. (Wt. %) | .5 | .15*7 |
| $H_2O$ (Wt. %) | 6.0 | 6.75 |
| App.Por. % | 20.2 | 21.4 |
| Bulk Den. #/$Ft^3$ | 180 | 173 |
| Cold Crushing, PSI | 13400 | 11400 |
| Firing Shrinkage, % | .19 | .25 |
| Erosion Loss, $cm^3$ | 5.1 | 4.8 |
| Thermal Cond. BTU/in/hr/$Ft^2$/°F. | 14.4 | 10.0 |
| Mix Characteristics | Excel. | Excel. |
| Remarks | *3 | *3 |

C.A.C. — High alumina calcium aluminate cement
F. $SiO_2$ — fumed silica
Deflocc. — sodium salt of polymerized substituted benzoid alkyl sulfonic acid deflocculant (Darvan(R), R. T. Vanderbilt Co., Inc.)
*1 - AZS started to settle out; surface cracks
*2 - Rough on top; voids on sides
*3 - Long pot life; Low sensitivity to water; vibrated very well
*4 - Pot life shortened
*5 - Very porous and crumbly when green
*6 - Very sensitive to $H_2O$ addition
*7 - Of the .15%, .05% is sodium citrate and 0.1% is Darvan ®

Water Content

As may be noted by comparing Examples 1 and 2, the water content has a significant effect on the cold crushing strength and abrasion resistance of the compositions, with the lower water content (5¾%) yielding the best results.

Cement Level

Examples 3, 4 and 5 illustrate the effect of high and low cement content. The high level of cement (50%) increased the open porosity to 27.1% and yielded a low bulk density of 153 lbs/$ft^3$ with a short pot life. The low cement level (10%) had very low strength and poor mixing and casting characteristics (honeycomb-type structure). The preferred level of cement (30%) yielded a composition with low open porosity, high bulk density, high strength and excellent mixing and casting characteristics.

Fume SiO₂ Content

The composition with the high fume SiO₂ level, Example 6, yielded a mix that was very sensitive to water content and sticky, stiff, and difficult to cast. Other than a high firing shrinkage, physical properties of cast pieces were about typical. The composition without fume $SiO_2$, Example 7, had higher porosity and higher erosion loss than the example of the preferred embodiment, Example 3.

Fused Alumina

Example 8 demonstrates that fused alumina grain may be substituted for AZS grain and give reasonable properties and abrasion resistance, strength, etc. The thermal conductivity of the refractory, however, is substantially higher than similar compositions made with AZS grain.

EXAMPLES 10 AND 11

To illustrate the effects of the use of and AZS with differing particle size distributions, Examples 10 and 11 were prepared, using an AZS with coarse and fine particle sizes, respectively. These AZS compositions had typical particle size distribution as follows:

| Tyler Mesh | Coarse Particle Size % on Screen Cumulative | Fine Particle Size % on Screen Cumulative |
|---|---|---|
| +4 | 0 | 0 |
| +6 | 23.3 | 0 |
| +8 | 61.6 | 0 |
| +10 | 94.2 | 0 |
| +12 | 99.9 | .1 |
| +14 | 100.0 | 6.6 |
| +20 | — | 25.7 |
| +28 | — | 40.1 |
| +35 | — | 51.8 |
| +325 | — | 88.7 |
| −325 | — | 11.3 |

These compositions and their physical properties are presented in Table 4.

TABLE 4

| | EX. 10 (Coarse) | EX. 11 (Fine) |
|---|---|---|
| AZS, Wt. % | 68 | 68 |
| C.A.C., Wt. % | 30 | 30 |
| Fume SiO₂, Wt. % | 2 | 2 |
| Defloc., Wt. % | .5 | .5 |
| H₂O, Wt. % | 5.5 | 7.5 |
| App. Por., % | 20.9 | 20.9 |
| Bulk Den., #/ft³ | 175 | 168 |
| Cold Crushing, PSI | 6854 | 15187 |
| Firing Shrinkage, % | .10 | .29 |
| Erosion Loss, cm³ | 4.3 | 5.1 |
| Thermal Cond., BTU/in/hr/ft²/°F. | 9.2 | 9.7 |
| Mix Characteristics | Fair | Fair/Good |
| Remarks | Many voids | Sides rolled while vibrating; looks like wet sand |

Comparing the data in Table 4 for Examples 10 and 11 with the data for Example 3 which utilized an AZS with the preferred particle size distribution, it can be seen that when the particle size of the AZS grain is coarse (Example 10), the cold crushing strength is measurably reduced and the voids in the cast piece are numerous. If the particle size of the AZS is fine (Example 11), the abrasion loss is slightly higher and the composition is very difficult to cast, having the characteristics of wet sand.

EXAMPLE 12

For purposes of comparison with the compositions of this invention, two castable compositions were evaluated using products typical of those now being marketed. The first of these comparison compositions, Comparative Example A, utilizes an Al₂O₃ base aggregate sized to −3 mesh and the second, Comparative Example B, utilizes −4 mesh AZS aggregate. Unlike the compositions of this invention, these comparison compositions contain none of the microspherical "filler" material designated as component (C) in the description of this invention. The compositions of Comparative Examples A and B and of Example 12 are as follows:

| | Percent by Wt. | | |
|---|---|---|---|
| Component | Ex. A | Ex. B | Ex. 12 |
| AZS | — | 65 | 68 |
| Calcined Bauxite | 70 | — | — |
| Calcium Aluminate Cement | 30 | 35 | 30 |
| Fume Silica | — | — | 2 |

The physical properties of these comparative examples as well as properties typical of a composition of this invention such as Example 12 are presented in Table 5.

TABLE 5

| Physical Properties After Firing to 816° C. | | | |
|---|---|---|---|
| | EX. A | EX. B | EX. 12 |
| Modulus of Rupture, PSI | 1800 | 1700 | 2500 |
| Cold Crushing, PSI | 12000 | 9000 | 12000 |
| Bulk Density, lbs/ft³ | 133 | 168 | 173 |
| Erosion Loss, cm³ | 8 | 7.5 | 4.5 |
| Linear Changes, % | −.2 | −.15 | −.2 |
| Thermal Conductivity, BTU/in/hr/ft²/°F. | 7.4 | 9.5 | 9.5 |

The data in Table 5 illustrate that the AZS-base castable of Comparative Example B is the most similar in physical properties to the castable of this invention. However, the physical properties of the composition of Comparative Example B are somewhat lacking compared to the invention composition of Example 12, particularly in modulus of rupture strength, cold crushing strength and erosion loss as measured by ASTM test C-704. These properties are the ones usually associated with service life in transfer lines of FCCU units and other high wear areas. The composition of Example 12, having an erosion loss of only 4.5 cm³ should have a service life almost twice that of the composition of Comparative Example B (erosion loss of 7.5 cm³) and in excess of two times that of the Al₂O₃ base castable of Comparative Example A.

What is claimed is:

1. A refractory composition which consists essentially of by weight:
   (a) 44 to 89 % of an abrasion-resistant refractory grain;
   (b) 10 to 50 % of a hydraulic cement;
   (c) 1 to 6 % of a filler consisting of very fine, substantially spherical particles of a material selected from the group consisting of $Al_2O_3$, $Cr_2O_3$, $ZrO_2$, $TiO_2$, clay minerals, carbon and fume $SiO_2$;
(d) 0.01 to 1%, based on the total weight of the constituents (a), (b) and (c), of additives selected from deflocculants and wetting agents.

2. The composition of claim 1 in which said abrasion-resistant refractory grain is selected from the group consisting of fused AZS, fused alumina, silicon carbide, fused mullite, fused zirconia, and fused alumina-zirconia.

3. The composition of claim 2 in which said abrasion-resistant refractory grain is a fused AZS comprising 32.5-54 by weight $ZrO_2$, 36-51 % by weight $Al_2O_3$, 2-16 % by weight $SiO_2$, 0.28-1.5 % by weight $Na_2O$, and less than 1.5 % by weight of other oxides.

4. The composition of claim 3 in which said abrasion-resistant refractory grain is a fused AZS comprising 49% $Al_2O_3$, 34 % $ZrO_2$, 15% $SiO_2$, 0.1% $Fe_2O_3$, 0.2% $TiO_2$, 1.5% $Na_2O$ and 0.2 % other oxides.

5. The composition of claim 1 in which the particles of the abrasion-resistant refractory grain range in size from about +325 mesh to about −4 mesh.

6. The composition of claim 5 in which the size distribution of the particles within the range of about +325 to about −4 mesh is substantially even.

7. The composition of claim 3 in which the particles of the abrasion-resistant refractory grain range in size from about +325 mesh to about −4 mesh.

8. The composition of claim 7 in which the size distribution of the particles within the range of about +325 to about −4 mesh is substantially even.

9. The composition of claim 6 in which the sizes of said particles are 0-5% +4 Tyler Mesh, 22-45 % +8 Tyler Mesh, 49-76% +14 Tyler Mesh, 68-90 +35 Tyler Mesh, 85-100% +325 Tyler Mesh, 0-15% −325 Tyler Mesh.

10. The composition of claim 8 in which the sizes of said particles are 0-5% +4 Tyler Mesh, 22-45 % +8 Tyler Mesh, 49-76% +14 Tyler Mesh, 68-90 +35 Tyler Mesh, 85-100% +325 Tyler Mesh, 0-15% −325 Tyler Mesh.

11. The composition of claim 9 in which the sizes of said particles are 0-1.5 % +4 Tyler Mesh, 32-35% 8 Tyler Mesh, 59-66% +14 Tyler Mesh, 78-84% +35 Tyler Mesh, 93-96% +325 Tyler Mesh, 4-7% −325 Tyler Mesh.

12. The composition of claim 10 in which the sizes of said particles are 0-1.5 % +4 Tyler Mesh, 32-35% 8 Tyler Mesh, 59-66% +14 Tyler Mesh, 78-84% +35 Tyler Mesh, 93-96% +325 Tyler Mesh, 4-7% −325 Tyler Mesh.

13. The composition of claim 1 in which said hydraulic cement is present in an amount of 20 to 40 % by weight.

14. The composition of claim 1 in which said hydraulic cement is a calcium aluminate cement.

15. The composition of claim 14 in which said hydraulic cement is a high purity calcium aluminate cement.

16. The composition of claim 1 in which said filler is present in an amount of 1 to 3 % by weight.

17. The composition of claim 3 in which said filler is present in an amount of 1 to 3 % by weight.

18. The composition of claim 1 in which said filler is fume $SiO_2$.

19. The composition of claim 3 in which said filler is fume $SiO_2$.

20. The composition of claim 16 in which said filler is fume $SiO_2$.

21. The composition of claim 17 in which said filler is fume $SiO_2$.

22. The composition of claim 8 in which said hydraulic cement is a high purity calcium cement and is present in an amount of 20 to 40 % by weight, and in which said filler is fume $SiO_2$ and is present in an amount of 1 to 3 % by weight.

23. The composition of claim 10 in which said hydraulic cement is a high purity calcium cement and is present in an amount of 20 to 40 % by weight, and in which said filler is fume $SiO_2$ and is present in an amount of 1 to 3 % by weight.

24. The composition of claim 12 in which said hydraulic cement is a high purity calcium cement and is present in an amount of 20 to 40 % by weight, and in which said filler is fume $SiO_2$ and is present in an amount of 1 to 3 % by weight.

25. A composition of claim 1 which is worked up by the addition of an amount of water comprised between 5.5-8 % by weight with respect to the total weight of constituents (a), (b), (c) and (d).

26. A composition of claim 1 which is worked up by the addition of an amount of water comprised between 6-7 % by weight with respect to the total weight of constituents (a), (b), (c) and (d).

27. The composition of claim 1 which exhibits, when fired, an erosion loss (measured according to ASTM C-704) of no greater than about 5.4 $cm^3$ and a thermal conductivity of no greater than about 10.6 BTU/in/hr/$ft^2$/° F.

28. The composition of claim 22 which exhibits, when fired, an erosion loss (measured according to ASTM C-704) of no greater than about 5.4 $cm^3$ and a thermal conductivity of no greater than about 10.6 BTU/in/hr/$ft^2$/° F.

29. The composition of claim 1 which exhibits, when fired, an erosion loss (measured according to ASTM C-704) of no greater than about 4.5 $cm^3$ and a thermal conductivity of no greater than about 9.5 BTU/in/hr/$ft^2$/° F.

30. The composition of claim 22 which exhibits, when fired, an erosion loss (measured according to ASTM C-704) of no greater than about 4.5 $cm^3$ and a thermal conductivity of no greater than about 9.5 BTU/in/hr/$ft^2$/° F.

* * * * *